US012220911B2

(12) United States Patent
Maki

(10) Patent No.: US 12,220,911 B2
(45) Date of Patent: Feb. 11, 2025

(54) PRINTING APPARATUS PRODUCING METHOD USING ADJUSTMENT PATTERN, ADJUSTING APPARATUS, AND ADJUSTING PROGRAM

(71) Applicant: SEIKO EPSON CORPORATION, Tokyo (JP)

(72) Inventor: Yoichiro Maki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 161 days.

(21) Appl. No.: 18/169,234

(22) Filed: Feb. 15, 2023

(65) Prior Publication Data

US 2023/0256730 A1 Aug. 17, 2023

(30) Foreign Application Priority Data

Feb. 17, 2022 (JP) ................................ 2022-022711

(51) Int. Cl.
*B41J 2/045* (2006.01)
*B41J 2/21* (2006.01)

(52) U.S. Cl.
CPC ....... *B41J 2/04508* (2013.01); *B41J 2/04586* (2013.01); *B41J 2/2103* (2013.01)

(58) Field of Classification Search
CPC .. B41J 2/04508; B41J 2/04586; B41J 2/2103; B41J 29/393
See application file for complete search history.

(56) References Cited

U.S. PATENT DOCUMENTS 6,076,915 A * 6/2000 Gast ........................ B41J 29/393 358/406
2007/0121179 A1* 5/2007 Yoshida ............... H04N 1/4076 358/504
2013/0278670 A1* 10/2013 Tanase .................. B41J 2/2132 347/19

FOREIGN PATENT DOCUMENTS

JP 2013-223988 A 10/2013

* cited by examiner

*Primary Examiner* — Thinh H Nguyen
(74) *Attorney, Agent, or Firm* — Global IP Counselors, LLP

(57) ABSTRACT

A printing apparatus producing method includes causing a printing apparatus before adjustment to print a multiple circle pattern and an adjustment pattern in predetermined relative positions on a medium, scanning the printed medium and generating a scan image, detecting the adjustment pattern based on a detection position of the multiple circle pattern detected from the scan image and the relative positions, calculating adjustment parameters based on a detection result of the adjustment pattern, and storing the adjustment parameters in a nonvolatile memory of the printing apparatus before adjustment to produce an adjusted printing apparatus.

15 Claims, 10 Drawing Sheets

PRINTING APPARATUS PRODUCING METHOD USING ADJUSTMENT PATTERN, ADJUSTING APPARATUS, AND ADJUSTING PROGRAM

The present application is based on, and claims priority from JP Application Serial Number 2022-022711, filed Feb. 17, 2022, the disclosure of which is hereby incorporated by reference herein in its entirety.

BACKGROUND

1. Technical Field

The present disclosure relates to a printing apparatus producing method, an adjusting apparatus, and an adjusting program.

2. Related Art

There has been known a technique for detecting a printing error by scanning a printing medium on which a specific adjustment pattern is printed by a printing apparatus. JP-A-2013-223988 (Patent Literature 1) discloses a technique for preventing, by using an adjustment pattern (a test pattern), concentration unevenness in a printing apparatus in which a part of a plurality of nozzle rows are arranged to overlap.

In order to detect a printing error using the adjustment pattern, in an image analysis in a scan image of an adjustment pattern printed on a medium, a size, a position, a tilt, and the like of the adjustment pattern need to be correctly specified.

SUMMARY

In view of the problem described above, a printing apparatus producing method is a printing apparatus producing method for producing a printing apparatus adjusted from a printing apparatus before adjustment, the printing apparatus producing method including: causing a printing section of the printing apparatus before adjustment to print a multiple circle pattern and an adjustment pattern in predetermined relative positions on a medium; setting the printed medium with respect to a scan section; scanning the printed medium and generating a scan image; detecting the multiple circle pattern from the scan image; detecting the adjustment pattern based on the relative positions and a detection position of the multiple circle pattern; calculating adjustment parameters based on a detection result of the adjustment pattern; and storing the adjustment parameters in a nonvolatile memory of the printing apparatus before adjustment.

Another aspect is an adjusting apparatus that adjusts a printing section of a printing apparatus, the adjusting apparatus including: a pattern detecting section configured to detect a multiple circle pattern in a scan image generated by scanning a medium on which the multiple circle pattern and an adjustment pattern used for the adjustment of the printing section are printed in predetermined relative positions by the printing section and detect the adjustment pattern based on the relative positions and a detection position of the multiple circle pattern; and an adjusting section configured to store, in a nonvolatile memory, adjustment parameters for the printing section based on a detection result of the adjustment pattern.

Another aspect is a non-transitory computer-readable storage medium storing an adjusting program for adjusting a printing section of a printing apparatus, the adjusting program causing a computer to function as: a pattern detecting section configured to detect a multiple circle pattern in a scan image generated by scanning a medium on which the multiple circle pattern and an adjustment pattern used for the adjustment of the printing section are printed in predetermined relative positions by the printing section and detect the adjustment pattern based on the relative positions and a detection position of the multiple circle pattern; and an adjusting section configured to store, in a nonvolatile memory, adjustment parameters for the printing section based on a detection result of the adjustment pattern.

Another aspect is a print generating method including printing, on a medium, an identification pattern for causing a scan section to read and automatically recognize the identification pattern and a multiple circle pattern, the identification pattern and the multiple circle pattern being printed in predetermined relative positions on the medium.

DESCRIPTION OF EXEMPLARY EMBODIMENTS

Figure 1:
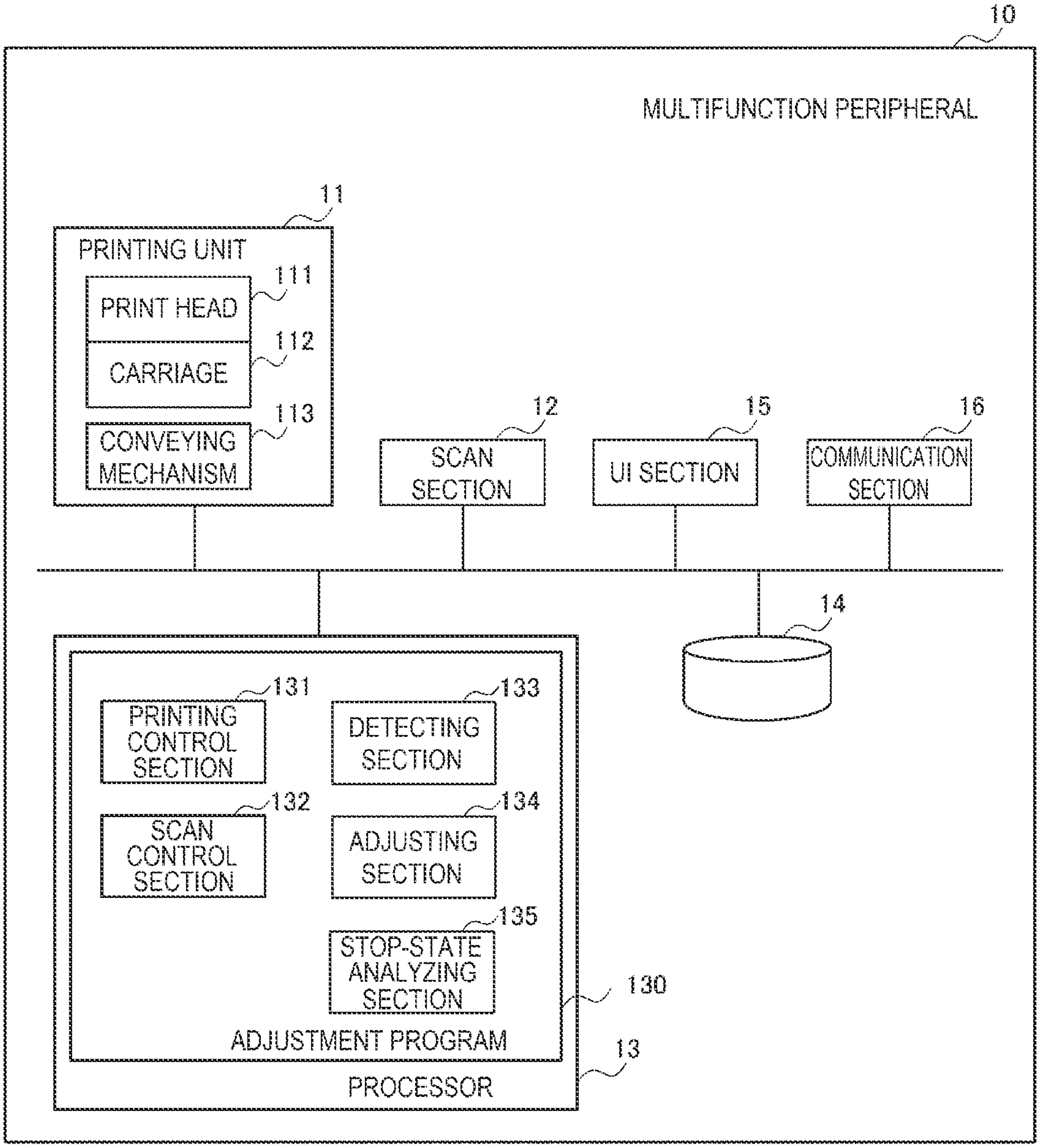
FIG. 1 is a configuration diagram of a multifunction peripheral.

FIG. 1 is a configuration diagram of a multifunction peripheral 10 according to an embodiment. The multifunction peripheral 10 has a printing function and a scanner function. The multifunction peripheral 10 may include a function other than these functions such as a facsimile function. The multifunction peripheral 10 includes a printing unit 11, a scan section 12, a processor 13, a nonvolatile memory 14, a UI section 15, and a communication section 16. The printing unit 11 includes a print head 111, a carriage 112, and a conveying mechanism 113.

The print head 111 includes nozzle rows respectively corresponding to four types of inks of CMYK (C: cyan, M: magenta, Y: yellow, and K: black) and performs printing in an inkjet scheme. The nozzle rows include pluralities of nozzles. The inks of the colors are ejected from the nozzles. The inks ejected from the nozzles are supplied from ink tanks (not shown) for the colors. The inks are ejected from the nozzles of the print head 111, whereby droplets (dots) of the inks are formed on a medium. The print head 111 is an example of the printing section.

The print head 111 is mounted on the carriage 112. The carriage 112 reciprocates in a specific direction according to control of the processor 13. According to the reciprocation of the carriage 112, the print head 111 reciprocates in the specific direction. The direction in which the print head 111 reciprocates is referred to as main scanning direction of the print head 111. The conveying mechanism 113 is a device that conveys a printing target medium. The conveying mechanism 113 conveys the medium in a direction perpendicular to the main scanning direction of the print head 111. The direction perpendicular to the main scanning direction of the print head 111, that is, the direction in which the medium is conveyed is referred to as sub-scanning direction of the print head 111.

In the nozzle rows for the colors of the print head 111, the pluralities of nozzles are disposed at equal intervals in the sub-scanning direction. The ejection of the inks of the colors from the nozzles in a process of the reciprocation of the print head 111 and the conveyance of the medium by the conveying mechanism 113 are repeated, whereby printing on the medium is performed.

The scan section 12 includes a light source and a light receiving element that receives light from a scan target object. A CMOS (Complementary Metal Oxide Semiconductor) line sensor of a CIS (Contact Image Sensor) scheme is used for the scan section 12 in this embodiment. As another example, the scan section 12 may be a sensor of a CCD (Charge Coupled Device) scheme. In the following explanation, in the line sensor, an array direction of the light receiving element is referred to as main scanning direction of the scan section 12.

Figure 2:
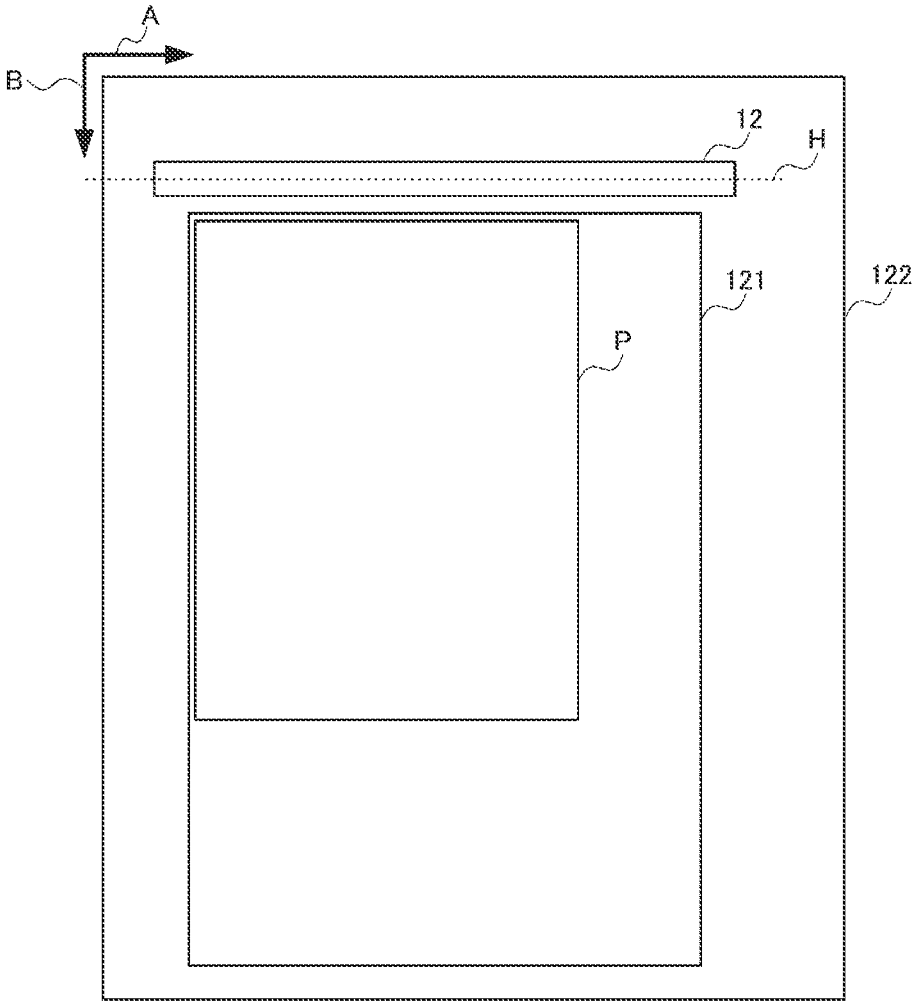
FIG. 2 is a diagram showing a positional relation between a scan section and a medium.

As shown in FIG. 2, the multifunction peripheral 10 includes a medium table 122 on which a glass surface 121 for placing a reading target object P is provided. That is, the multifunction peripheral 10 includes a flatbed-type scan device including the scan section 12, the glass surface 121, and the medium table 122. The scan section 12 moves in a direction B perpendicular to a main scanning direction A on the glass surface 121 under the control of the processor 13. In the following explanation, a direction perpendicular to the main scanning direction is referred to as sub-scanning direction of the scan section 12. The scan section 12 repeats reading while moving in the sub-scanning direction by a predetermined amount at a time to read the entire target object P. The scan section 12 is located in a retracted position (a home position) H at a non-reading operation time and starts movement from the home position H in the sub-scanning direction at a reading operation time.

In this embodiment, relative positions of the target object P and the scan section 12 change when the scan section 12 moves with respect to the placed target object P. However, as another example, the relative positions may change when the medium is conveyed in the sub-scanning direction by the conveying mechanism 113 with respect to the fixed scan section 12.

The processor 13 includes a RAM, a CPU, and the like. The nonvolatile memory 14 stores various data and programs. The processor 13 can execute the programs stored in the nonvolatile memory 14. The UI section 15 includes an input section for receiving an input of a user and a display section that displays various kinds of information to the user. The communication section 16 communicates with external apparatuses such as a PC and a tablet terminal connected by wired communication, wireless communication, or the like.

In the multifunction peripheral 10 in this embodiment, the printing unit 11 prints a test pattern on the medium. The test pattern is an image in which a predetermined pattern is shown in a predetermined position. The multifunction peripheral 10 can adjust control content of the printing unit 11 by scanning the medium on which the test pattern is printed and performing an image analysis. This processing is explained in detail below. Examples of the adjustment of the control contents include adjustment of medium conveyance deviation (PF deviation or Paper Feed deviation) and adjustment of deviation (Bi-D) of a dot formation position due to relative position movements at the reciprocation time in the main scanning direction of the printing unit 11 and the medium. An adjustment target only has to be a mechanism, a physical quantity of which can be specified from the test pattern, and is not limited to the embodiment.

The processor 13 in this embodiment includes, as functional components for adjusting the printing unit 11 by using the test pattern, a printing control section 131, a scan control section 132, a detecting section 133, an adjusting section 134, and a stop-state analyzing section 135. Functions of the printing control section 131, the scan control section 132, the detecting section 133, the adjusting section 134, and the stop-state analyzing section 135 are realized by the processor 13 reading out and executing an adjustment program 130 stored in the nonvolatile memory 14. That is, in the following explanation, processing described as being executed by the printing control section 131, the scan control section 132, the detecting section 133, the adjusting section 134, and the stop-state analyzing section 135 is processing executed by the processor 13.

The printing control section 131 performs control for the printing unit 11. The scan control section 132 performs control for the scan section 12. The detecting section 133 detects a predetermined pattern in a scan image. The adjusting section 134 adjusts the printing unit 11 based on a result of the pattern detection by the detecting section 133. When the scan section 12 performs an intermittent scan, the stop-state analyzing section 135 performs a state analysis in a stop state in which movement of the scan section 12 is temporarily stopped. The intermittent scan is a scan for, halfway in movement in the sub-scanning direction of the scan section 12, repeating a temporary stop and resumption of the movement and irradiation, for example, temporarily stopping and resuming the movement in the sub-scanning direction and irradiation (lighting) by the light source. The intermittent scan is performed when a free capacity of the memory is small and scan images of the entire medium cannot be stored.

In the intermittent scan, when the movement in the sub-scanning direction of the scan section 12 and the lighting are temporarily stopped, scan images obtained up to that point in time (a part of the scan images of the entire medium) are recorded in the memory. An image analysis (pattern matching) is performed for the images. After the image analysis is completed, the scan images recorded in the memory are deleted and the movement in the sub-scanning direction and the lighting are resumed from a stop position where the movement in the sub-scanning direction and the lighting are temporarily stopped. Consequently, the pattern matching over the entire scan images can be performed with a limited memory capacity. Processing of the functional components is explained in detail below.

Figure 3:
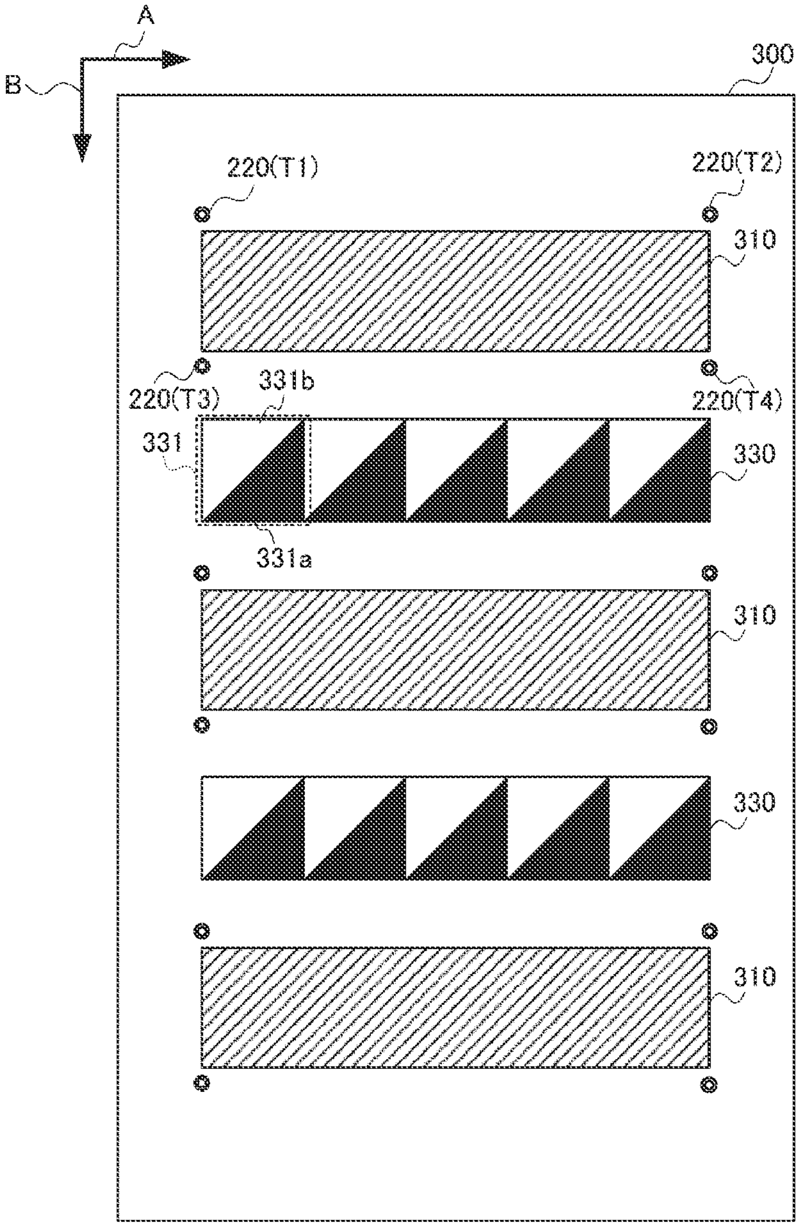
FIG. 3 is a diagram showing a test pattern.

FIG. 3 is a diagram showing an example of a test pattern according to this embodiment. The print head 111 prints a test pattern 300 on the medium under control of the printing control section 131. It is assumed that image data of the test pattern 300 is stored in advance in the nonvolatile memory 14. The image data of the test pattern 300 may be stored in an external apparatus and transmitted from the external apparatus to the multifunction peripheral 10.

The test pattern 300 includes a plurality of adjustment patterns 310 for adjusting the printing unit 11. The test pattern 300 further includes a multiple circle pattern 220. The multiple circle pattern 220 is a pattern in which the circumferences of a plurality of concentric circles having different radiuses are indicated by black. A shape and the like of the multiple circle pattern 220 are explained in detail below. The multiple circle pattern 220 is arranged in a predetermined relative position based on the adjustment pattern 310 to be in a known positional relation with the adjustment pattern 310. Therefore, by detecting the multiple circle pattern 220, it is possible to predict a range in which the adjustment pattern 310 is present and reduce a search time for the adjustment pattern 310.

In order to adjust the printing unit 11, it is necessary that a position, a size, a tilt, and the like of the adjustment pattern 310 printed on the medium can be accurately specified from the scan image. The multiple circle pattern 220 is a pattern used to accurately specify the position and the size of the adjustment pattern 310 from the scan image.

In this embodiment, four multiple circle patterns 220 are arranged in four positions T1 to T4 with respect to one adjustment pattern 310. The positions T1 to T4 are arranged at the vertexes of a rectangle having two sides in the main scanning direction and the sub-scanning direction. In this way, the four multiple circle patterns 220 are arranged to form a rectangle having a known size.

For example, a relation between relative positions (a relative positional relation) of the position T1 of the multiple circle pattern 220 and an upper left vertex 211 of the adjustment pattern 310 is set in advance. Therefore, the processor 13 can perform pattern detection for the adjustment pattern 310 using the position of the multiple circle pattern 220 as a mark. Further, the processor 13 can specify and correct presence or absence of distortion, a tilt, and the like in the scan image based on a scan result of the four multiple circle patterns 220 arranged in the rectangular shape and the known size of the rectangle as explained above.

Processing of the detecting section 133 is explained. The multiple circle pattern 220 is detected by pattern matching with image data (a reference pattern) of the multiple circle pattern 220 stored in advance in the nonvolatile memory 14. In the pattern matching, first, the detecting section 133 sets, in the scan image, as a comparison region, a range of a predetermined number of pixels from the upper left vertex 211 in a peripheral region of a position where it is predicted based on the relative positional relation that the reference pattern is present. While shifting the comparison region in pixel units, the detecting section 133 performs comparison with the reference pattern in comparison regions.

Specifically, the detecting section 133 compares pixel values (luminances) about pixels of the comparison region and pixels of the reference pattern corresponding to the pixels of the comparison region. The detecting section 133 calculates a total value of absolute values of differences between the pixel values (the luminances) obtained by the comparison. When the pixel values completely coincide, theoretically, the total value of the differences is zero. The detecting section 133 calculates a matching rate based on the total value of the differences. The matching rate is a value that is 100% when the total value of the differences is zero and decreases as the total value of the differences increases. The detecting section 133 detects a comparison region where the matching rate is the largest as a range of the multiple circle pattern 220 and specifies the center of the range as a multiple circle pattern position. The detecting section 133 repeats this to detect four multiple circle patterns that surround a target adjustment pattern.

The detecting section 133 detects an adjustment pattern based on a detection result of the four multiple circle patterns, that is, detection positions of the multiple circle patterns. Specifically, the detecting section 133 predicts, based on a relative positional relation between the four multiple circle patterns and the adjustment pattern set in advance, a range in which the adjustment pattern is present. As explained above, the detecting section 133 adjusts the distortion and the tilt of the adjustment pattern in the detection result of the scan image based on the detection result of the four multiple circle patterns. It is possible to reduce processing for searching for a multiple circle pattern by setting the comparison region based on the upper left vertex 211. It is possible to highly accurately grasp the position of the adjustment pattern by highly accurately detecting the multiple circle pattern by setting the comparison region. Consequently, it is possible to highly accurately adjust the printing unit 11 with lighter processing.

Subsequently, the multiple circle pattern is explained with reference to FIGS. 4A, 4B, 4C, 5, 6A, and 6B. In the multifunction peripheral 10 in this embodiment, the multiple circle pattern is used as a position correction pattern for correcting the position of the adjustment pattern. There are the following three problems in detecting the position correction pattern.

1) Accuracy deterioration of pattern matching due to a tilt of the medium during scan 2) Lack of a print image due to nozzle skipping 3) Deterioration in position accuracy due to bleeding of ink It is necessary that the position of the position correction pattern can be accurately detected even when these situations occur. It is seen from the first problem that, as the position correction pattern, a pattern, a matching rate of which decreases when the medium tilts, such as a square pattern, a triangular pattern, an X-shaped pattern, or the like is not preferable and, therefore, a circular pattern is preferable.

However, for example, in a circular pattern painted out in one color, when a part of the circular pattern is lacked by nozzle skipping as indicated by the second problem, it is likely that the position of the position correction pattern is specified by mistake.

Figure 4A:
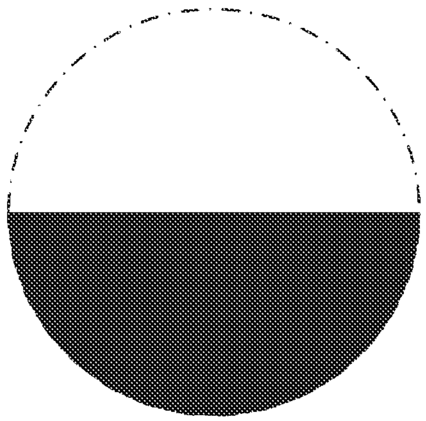
FIG. 4A is an explanatory diagram of a multiple circle pattern.
Figure 4B:
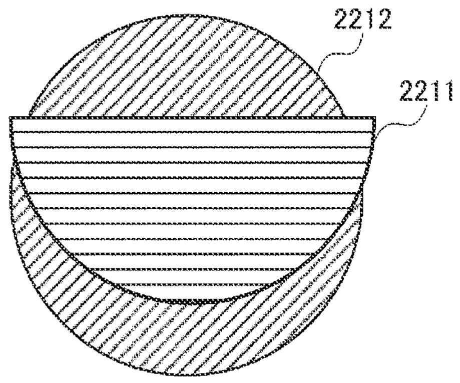
FIG. 4B is an explanatory diagram of a multiple circle pattern.

For example, it is assumed that an upper half of a circle is lacked by nozzle skipping as shown in FIG. 4A. A portion indicated by an alternate long and short dash line is a lacked portion. When the half is lacked in this way, as shown in FIG. 4B, in a painted-out circular pattern, pixels that do not actually coincide have close luminance values in pattern matching of a semicircular comparison region 2211 and an entire circle (a reference pattern) 2212. Accordingly, a marked difference in a matching rate less easily appears between a comparison region that should originally coincide with the reference pattern and a comparison region that should not originally coincide with the reference pattern. Therefore, a wrong position is specified as the position of the multiple circle pattern.

Figure 4C:
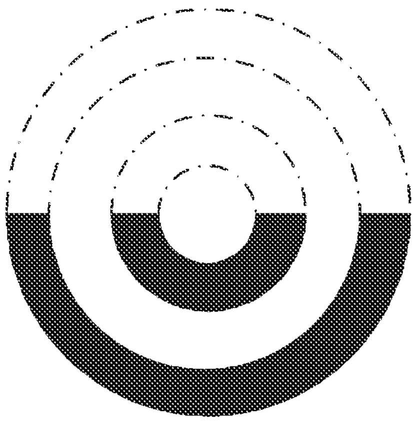
FIG. 4C is an explanatory diagram of a multiple circle pattern.

In contrast, as shown in FIG. 4C, since a plurality of edges are present in the multiple circle pattern, in pattern matching of a comparison region and the reference pattern that do not actually coincide, there are more pixels, luminances of which do not coincide, among pixels and a matching rate is higher compared with the painted-out circle. Therefore, it is possible to more highly accurately specify a center position compared with the painted-out circle. Therefore, in the multifunction peripheral 10 in this embodiment, a multiple circle is used as the position correction pattern.

Figure 5:
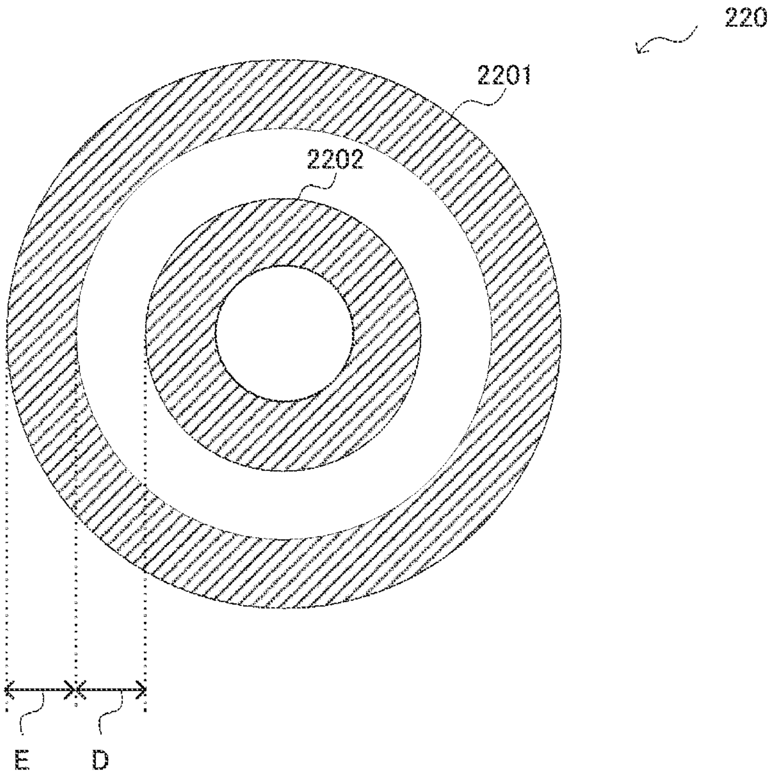
FIG. 5 is an enlarged diagram of a multiple circle pattern.

FIG. 5 is an enlarged diagram of the multiple circle pattern 220 according to this embodiment. The multiple circle pattern 220 according to this embodiment is a pattern showing a double circle. The multiple circle pattern 220 is a pattern showing lines 2201 and 2202 of two circumferences having the same center and different radiuses. As shown in FIG. 5, the multiple circle pattern 220 is a pattern, the circumferences of which are drawn by black lines. Black portions of the circumferences are indicated by hatching.

It is assumed that specifying accuracy of one pixel or less at 600 dpi is requested for the adjustment pattern. In this case, both of resolutions at a scan time and a printing time need to be set to 600 dpi. It is assumed that, when the resolutions at the scan time and the printing time are set to 600 dpi, an interval D between the lines 2201 and 2202 of the two circumferences is length equivalent to seven pixels. More preferably, the interval D between the lines may be set to seven pixels or more or may be set to eight pixels or more. It is assumed that thickness E of the lines drawing the two circumferences is length equivalent to seven pixels. More preferably, the thickness of the lines may be set to 7 pixels or more or may be set to eight pixels or more.

The setting the interval D between the lines of the circumferences to seven pixels corresponds to the third problem described above. By setting the interval D between the lines to seven pixels, it is possible to prevent a region that should originally be an interval of circumferences from being misrecognized in pattern matching because of bleeding of the ink. By sufficiently securing the interval in this way, it is possible to correctly specify the position of the multiple circle pattern even when bleeding of the ink occurs. By setting the thickness of the lines to seven pixels or more, in image recognition of the scan image of the test pattern, it is possible to accurately recognize each of a region where the ink is applied and a region where the ink is not applied.

Figure 6A:
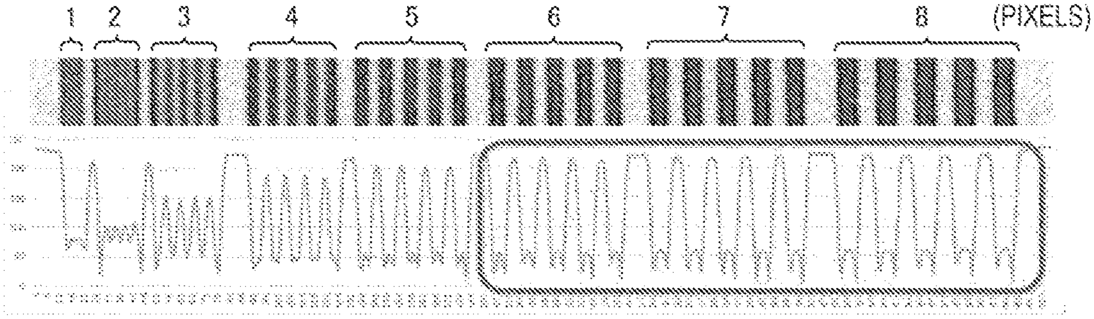
FIG. 6A is a diagram showing an experiment result of a bleeding degree of a pigment.
Figure 6B:
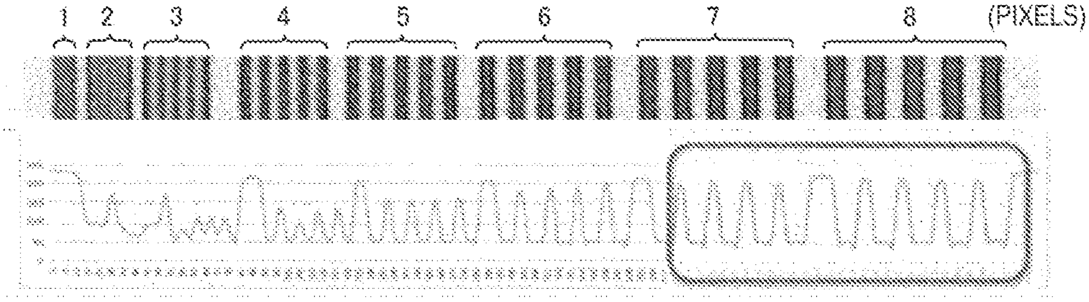
FIG. 6B is a diagram showing an experiment result of a bleeding degree of a dye.

FIGS. 6A and 6B are diagrams showing an experiment result of evaluating a degree of bleeding of the ink by changing the interval of lines and the thickness of the lines. Prints on which lines are printed are shown in upper parts of FIGS. 6A and 6B. In lower parts of FIGS. 6A and 6B, graphs in which the lateral direction of the prints in the upper parts of FIGS. 6A and 6B is set as a horizontal axis and luminance is plotted on a vertical axis is shown. As it is seen from the result shown in FIG. 6A in which the print is printed by pigment ink, when the interval of the lines is one pixel, the interval of the lines is filled by bleeding and high luminance is not obtained. On the other hand, it is seen that, when the interval of the lines exceeds seven pixels, high luminance is obtained in a range of the interval of the lines. As shown in FIG. 6B in which the print is printed by dye ink, it is seen that high luminance is obtained by dye in the range of the interval of the lines when the interval of the lines exceeds eight pixels. From these results, seven or more pixels are preferable for the pigment and eight or more pixels are preferable in order to surely obtain high luminance in both of the dye and the pigment.

When the thickness E of the lines of the pattern decreases, detection accuracy for the line decreases. Therefore, the thickness E of the lines is set to the same degree as the interval D of the lines. Consequently, it is possible to accurately detect both of a portion of the lines and a portion without the lines.

Further, when the interval D of the lines and the thickness E of the lines are set to eight pixels, a size (a diameter) of a multiple circle pattern (a double circle pattern) is calculated as 2.7 mm by Expression 1 in 600 dpi printing. A size (a diameter) of a triple circle pattern is calculated as 4.1 mm by Expression 2. It is assumed that a radius of a white circle portion in the center is eight pixels.

[Math. 1]

$$8\text{ pixels}/600\text{ dpi}\times 8\text{ times}\cong 2.7\text{ mm} \qquad \text{(Expression 1)}$$

$$8\text{ pixels}/600\text{ dpi}\times 12\text{ times}\cong 4.1\text{ mm} \qquad \text{(Expression 2)}$$

The sizes of the double circle pattern and the triple circle pattern are respectively sizes close to characters having font sizes of approximately 10.5 and 12. If the size of the multiple circle pattern is larger than necessary, a printable range of the adjustment pattern is narrowed. As the size of the multiple circle pattern is larger, a time required for pattern matching is longer. Therefore, the size of the multiple circle pattern is preferably small to a certain degree. Although the radius of the white circle in the center is set to eight pixels here, the diameter of the white circle in the center only has to be equal to or larger than the interval of the lines.

Further, it is assumed that the multiple circle pattern is printed in one path by a nozzle row for the same color. It is assumed that the multiple circle pattern in this embodiment is printed in pure black. For example, when the multiple circle pattern is printed in composite black, it is likely that deviation of ejection positions of the inks of the colors due to positional deviation among the nozzle rows occurs at a printing time of the multiple circle pattern. In contrast, by printing the multiple circle pattern with the nozzle row for the same color, it is possible to prevent such a problem of the positional deviation from occurring. By forming the black multiple circle, contrast with white is large and it is possible to improve accuracy of the pattern matching.

Subsequently, the intermittent scan is explained. In the intermittent scan, the medium sometimes moves because, for example, the user touches the medium by mistake while the movement of the scan section 12 and the lighting are temporarily stopped. The medium moving means that a position and a tilt of the medium with respect to the glass surface 121 change. When pattern matching of a scan image obtained after resumption is performed assuming that the medium has not moved irrespective of the fact that the medium has moved, a correct result cannot be obtained in the pattern matching. Therefore, a correct adjustment pattern cannot be set. In the following explanation, such a movement of the medium is referred to as medium deviation as well.

The irradiation from the light source of the scan section 12 is also stopped at the temporary stop time of the intermittent scan. When the irradiation from the light source is started at the resumption time of the intermittent scan, a light amount is unstable and a necessary light amount is sometimes not obtained. When the light amount is smaller than a reference, the scan section 12 cannot continue the reading. When the intermittent scan is performed, the multifunction peripheral 10 detects changes in the position and the tilt of the medium during the temporary stop and a light amount from the light source and determines, according to a detection result, suspension or the like of the intermittent scan. In the following explanation, timing of the temporary stop is referred to as temporary stop time. Timing when an analysis of pattern matching or the like of a scanned image is already completed after the temporary stop and immediately before the movement of the scan section 12 is resumed in the intermittent scan is referred to as resumption time. The resumption time only has to be timing after the temporary stop time, timing after the scan image stored in the memory is deleted, and timing before timing when the movement of the scan section 12 is resumed.

Subsequently, a determination pattern 330 of the test pattern 300 is explained. The determination pattern 330 is an example of an identification pattern for specifying medium deviation and changes in light amounts at the temporary stop time and the resumption time. In the test pattern 300, the determination pattern 330 is arranged between two adjustment patterns 310 in a direction corresponding to the sub-scanning direction of the printing unit 11. In the test pattern 300 shown in FIG. 3, the adjustment pattern 310, the determination pattern 330, the adjustment pattern 310, the determination pattern 330, and the adjustment pattern 310 are arranged in this order in a direction corresponding to the sub-scanning direction of the scan section 12. In this way, in the test pattern 300, the determination pattern 330 is arranged following the adjustment pattern 310 in the sub-scanning direction. The two adjustment patterns 310 arranged across the determination pattern 330 are examples of the first adjustment pattern and the second adjustment pattern.

The determination pattern 330 is a pattern in which a plurality of square basic patterns 331 are arranged in the sub-scanning direction. The basic patterns 331 are arranged such that one set of opposed two sides is parallel to the main scanning direction. Further, each of the basic patterns 331 includes a black pattern 331*a* of a black triangle and a white pattern 331*b* of a white triangle having one diagonal line as a boundary.

Figure 7:
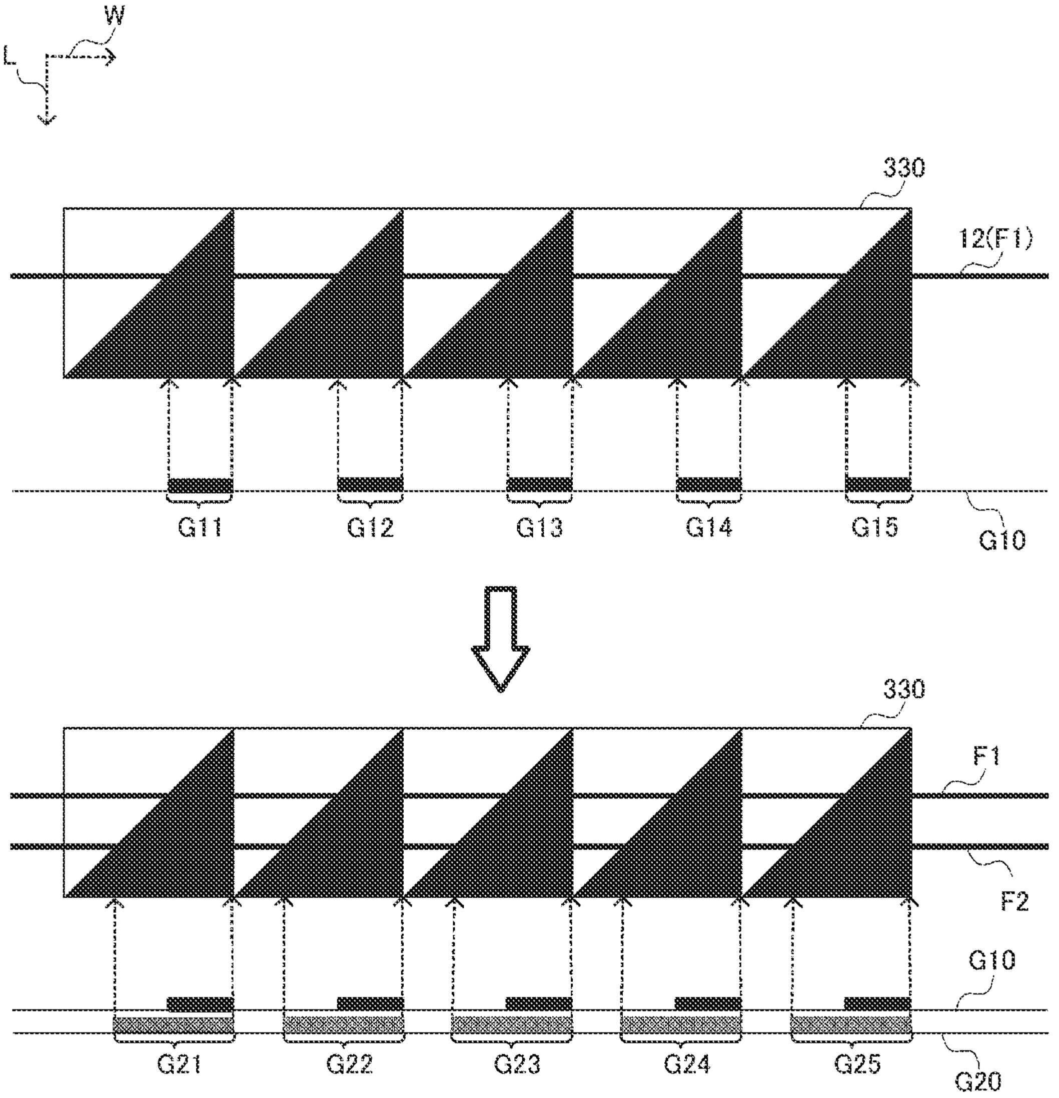
FIG. 7 is an explanatory diagram of processing for determining whether a medium has moved.
Figure 8:
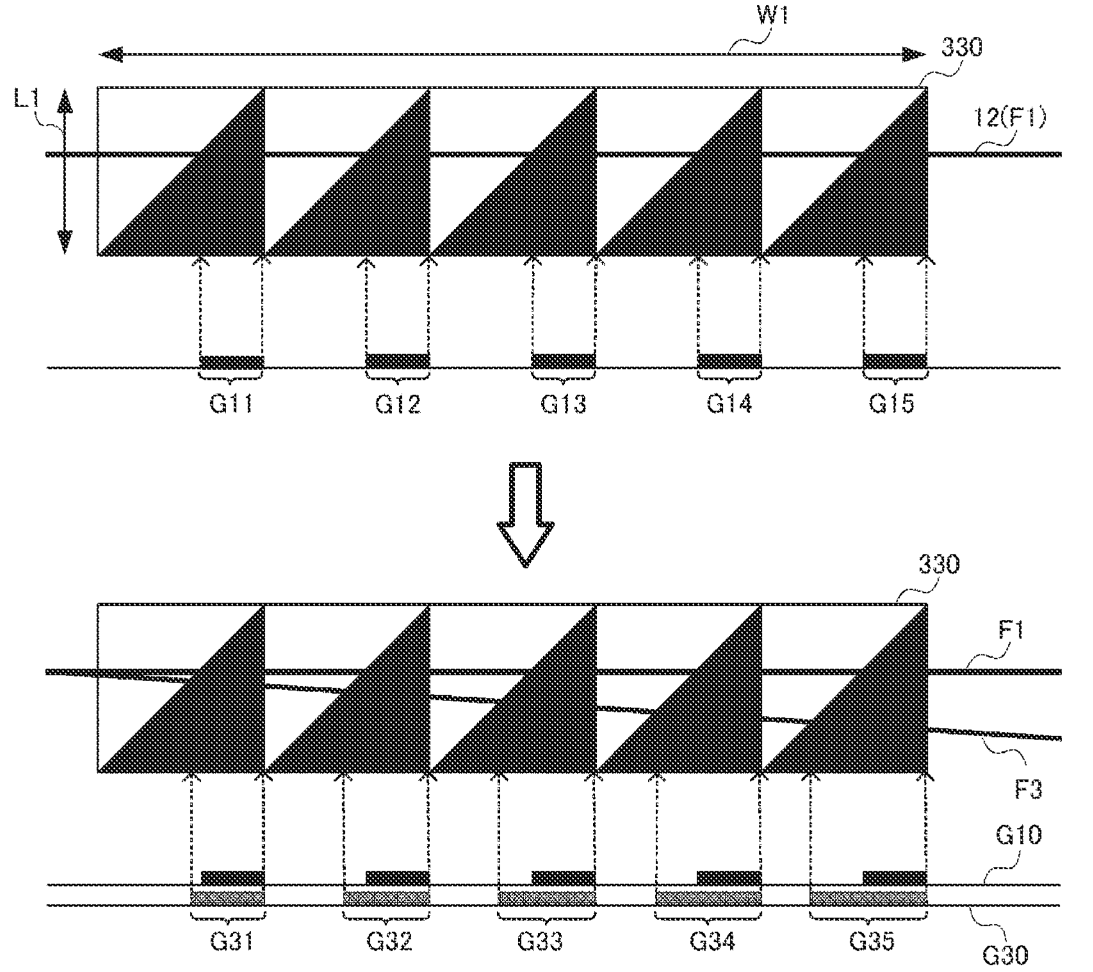
FIG. 8 is an explanatory diagram of processing for determining whether the medium has moved.

The stop-state analyzing section 135 performs a state analysis during the temporary stop in the intermittent scan by using the test pattern 300 including the determination pattern 330. Specifically, the stop-state analyzing section 135 determines whether the medium has moved at the temporary stop time and, when the medium has moved, specifies a movement amount and a tilt change amount of the medium. FIGS. 7 and 8 are diagrams for explaining processing for determining whether the medium has moved. In FIGS. 7 and 8, the medium on which the test pattern 300 is printed has a rectangular shape. A length direction L and a width direction W of the medium are defined. It is assumed that the length direction L of the medium corresponds to a conveying direction of the medium at a time of printing the test pattern 300 on the medium (the sub-scanning direction of the printing unit 11). For convenience of explanation, at a scan start time, the medium is set such that the length direction L of the medium coincides with the sub-scanning direction of the scan section 12.

As shown in an upper part of FIG. 7, it is assumed that the scan section 12 has temporarily stopped in a position corresponding to a straight line F1 on the medium during the intermittent scan. In the following explanation, the scan section 12 being located in a position corresponding to a predetermined position on the medium is referred to as the scan section 12 being located in the predetermined position on the medium.

It is assumed that the position of the medium is translated in the length direction L during the temporary stop and the intermittent scan is resumed in a state in which the position of the medium is translated. In this case, as shown in a lower part of FIG. 7, a relative positional relation between the scan section 12 and the medium changes. Consequently, the scan section 12 is located on, for example, a straight line F2 on the medium at a resumption time of the intermittent scan. A line image G10 scanned when the scan section 12 is located on the straight line F1 and a line image G20 scanned when the scan section 12 is located on the straight line F2 are different images.

The line image G10 includes five black ranges G11, G12, G13, G14, and G15. White ranges are included among the black ranges. Similarly, the line image G20 includes five black ranges G21, G22, G23, G24, and G25. White ranges are included among the black ranges. However, detection positions of the line image G10 and the line image G20 are different in the length direction L on the medium. Accordingly, the width of the black ranges of the line image G10 and the width of the black ranges of the line image G20 are different. Therefore, movement of the medium in the sub-scanning direction can be detected according to such a change in the widths of the black ranges. In the movement of the medium in the sub-scanning direction, a tilt of the medium does not change. Therefore, all of the widths of the black ranges G21 to G25 of the line image G20 are the same value.

Further, a change in the tilt of the medium can also be detected by using the determination pattern. It is assumed that, after the scan section 12 stops in a position of the straight line F1 shown in an upper part of FIG. 8, the tilt of the medium changes and, as shown in a lower part of FIG. 8, a relative position of the scan section 12 with respect to the medium changes to a position of a straight line F3 of the medium. In this case, a line image G30 is obtained at a resumption time. Like the line image G10, the line image G30 includes five black ranges G31, G32, G33, G34, and G35.

Tilts of the straight lines (F1 and F3) corresponding to detection positions of the line image G10 and the line image G30 are different. Accordingly, the width of the black range of the line image G10 and the width of the black range of the line image G30 are different. Further, the widths of the black ranges included in the line image G30 gradually increase in the order of G31 to G35 because of a tilt of the straight line F3 with respect to the straight line F1. In this way, it is possible to detect changes in the tilt of the medium at the temporary stop time and the resumption time based on the change between the width of the black range included in the line image G10 and the width of the black range included in the line image G30 and the change among the widths of the black ranges included in the line image G30.

The black pattern 331*a* has two sides (two straight lines) inclining with respect to the main scanning direction of the scan section 12. Inclination angles of the two sides with respect to the main scanning direction are different. Since the determination pattern includes a plurality of lines having different inclination angles with respect to the main scanning direction in this way, an obtained linear detection pattern is different according to medium deviation. Accordingly, it is possible to detect changes in the position and the tilt of the medium by using such a determination pattern.

Subsequently, processing for specifying a movement amount of the medium and a tilt change amount when the medium has moved is explained. As shown in FIG. 8, when the medium has moved in the sub-scanning direction, a movement amount in the sub-scanning direction can be specified according to a change in the width of the black range. When the medium has moved in the main scanning direction, a movement amount in the main scanning direction can be specified according to a change in the position of the black range.

Figure 9:
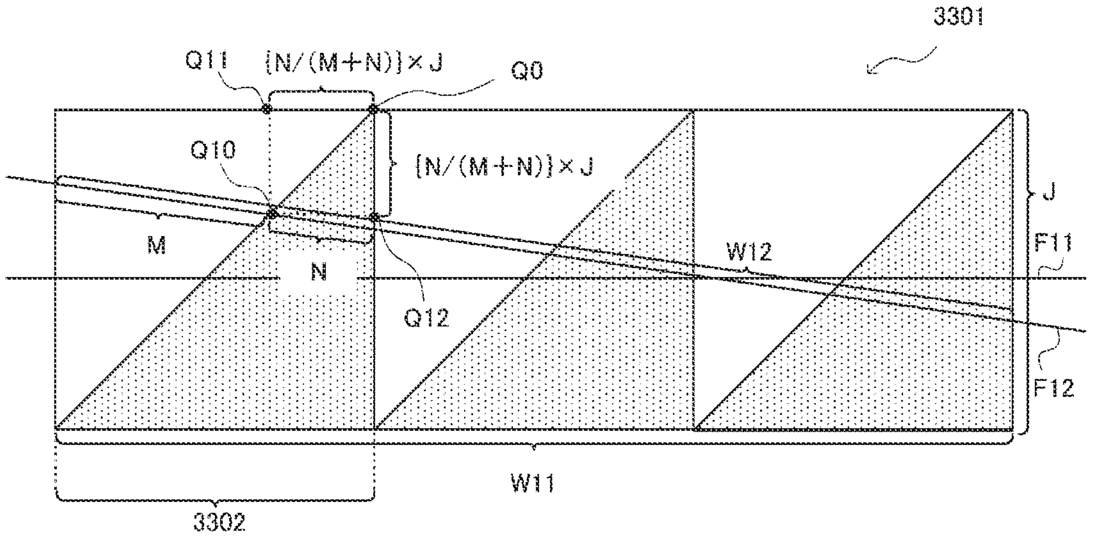
FIG. 9 is an explanatory diagram of a tilt change amount of the medium.

FIG. 9 is an explanatory diagram of a tilt change amount θ of the medium in the case in which the medium tilts. In FIG. 9, for convenience of explanation, a determination pattern in which three basic patterns are arranged is shown. As shown in FIG. 9, the width of a determination pattern 3301 in a line image obtained on a straight line F11 at the temporary stop time is represented as W11 and the width of a line image obtained on a straight line F12 at the resumption time is represented as W12. The length of one side of a basic pattern 3302 of the determination pattern 330 is represented as J and the width of a white range and the width of a black range of the basic pattern 3302 obtained at the resumption time are respectively represented as M and N. A point at the paper surface upper right of FIG. 9 in the basic pattern 3302 is represented as Q0. Further, an intersection of a boundary line between the black range and the white range of the basic pattern 3302 and the straight line F12 at the stop time is represented as Q10. A point, the position in the main scanning direction of which is equal to Q0 and the position in the sub-scanning direction of which is different from Q10, is represented as Q11. A point, the position in the sub-scanning direction of which is equal to Q0 and the position in the main scanning direction of which is different from Q10, is represented as Q12. In this case, both of the length between Q0 and Q11 and the length between Q0 and Q12 are {N/(M+N)×J}. The tilt change amount θ is represented by Expression 3.

[Math. 2]

$$\theta = \arctan\left(\frac{\sqrt{(W12)^2 - (W11)^2}}{(W11)}\right) \quad \text{(Expression 3)}$$

The tilt of the medium can also be detected from a change in the length corresponding to width W1 of the determination pattern shown in FIG. 8. For example, on the straight line F1, length of W1 is obtained. On the other hand, on the straight line F3, the length of the determination pattern is longer than W1. When the length of the width of the determination pattern has changed in this way, it can be detected that the tilt has changed. The tilt can be specified from a change amount of the width. The length of the determination pattern is obtained by detecting an end portion in the width direction of the determination pattern. The translation in the main scanning direction of the medium can be detected from deviation of the position of an edge corresponding to the width W1 in the length direction of the determination pattern. A movement amount can be specified from a degree of the positional deviation. As explained above, the stop-state analyzing section 135 determines whether the medium has moved and, when the medium has moved, specifies a movement amount and a change amount of the tilt.

The above explanation is based on the premise that the length direction L of the medium coincides with the sub-scanning direction of the scan section 12. However, the length direction L of the medium may not coincide with the sub-scanning direction of the scan section 12. In this case, for example, medium deviation (deviation of the position and the tilt of the medium) at the scan start time is specified in advance by pattern matching using a position correction marker. After the medium deviation at the start time is considered, as explained above, presence or absence of a movement and a degree of the medium deviation only have to be detected.

First, the stop-state analyzing section 135 acquires a line image obtained by the scan section 12 at the temporary stop time. In the following explanation, the line image is referred to as stop-time line image. The stop-state analyzing section 135 acquires a line image obtained by the scan section 12 at the resumption time. In the following explanation, the line image is referred to as resumption-time line image. In the example explained above, the line image obtained on the straight line F1 is equivalent to the stop-time line image and the line images obtained on the straight lines F2 and F3 are equivalent to the resumption-time line image. The stop-time line image and the resumption-time line image are respectively examples of the stop-time image and the resumption-time image.

Further, the stop-state analyzing section 135 calculates, with edge detection, a boundary line of the determination pattern and both ends of a black range. The stop-state analyzing section 135 compares the positions of both the ends of the black range obtained by the edge detection at each of the temporary stop time and the resumption time. When a total of change amounts of edge positions (the ends of the black range) corresponding to the positions is within a preset reference range, the stop-state analyzing section 135 determines that the edge positions are equal and the medium has not moved. When the total of the change amounts is outside the reference range, the stop-state analyzing section 135 determines that the medium has moved. The stop-state analyzing section 135 calculates width of the black range from the edge positions and specifies a degree of medium deviation (change amounts of the movement and the tilt of the medium) based on a change in the width. As another example, the stop-state analyzing section 135 may determine, based on widths of black ranges calculated from the edge positions, whether the medium has moved.

It is assumed that the scan section 12 includes three line sensors corresponding to RGB colors. However, it is assumed that the line images at the stop time and the resumption time are scanned by the line sensor for any one color. That is, the stop-time image and the resumption-time image are images having a color corresponding to the line sensor. Consequently, it is possible to reduce a calculation amount in, for example, detecting whether the medium has moved. The three line sensors correspond to a first line sensor that scans a first color, a second line sensor that scans a second color, and a third line sensor that scans a third color.

Further, the stop-state analyzing section 135 detects a light amount of the light source at the resumption time of the intermittent scan. This processing is explained below. The stop-state analyzing section 135 creates a histogram in which luminances are plotted on a horizontal axis and a frequency of luminance is plotted on a vertical axis in the resumption-time line image and specifies a maximum value of the luminance. When the maximum value is a value within a continuable range, the stop-state analyzing section 135 continues the intermittent scan. In the intermittent scan, when the movement is temporarily stopped, the irradiation of the light by the light source is also stopped. Accordingly, when the irradiation of the light by the light source is started at the resumption time, a light amount is sometimes unstable. The continuable range is an evaluation value for determining whether a light amount is such an unstable light amount. That is, it is assumed that the continuable range is a range of a light amount with which the medium reading can be continued and is set in advance. The evaluation value for the stop-state analyzing section 135 to determine whether a light amount is within the continuable range only has to be a value decided based on luminances of the resumption-time line image and is not limited to the maximum value of the luminance.

Figure 10:
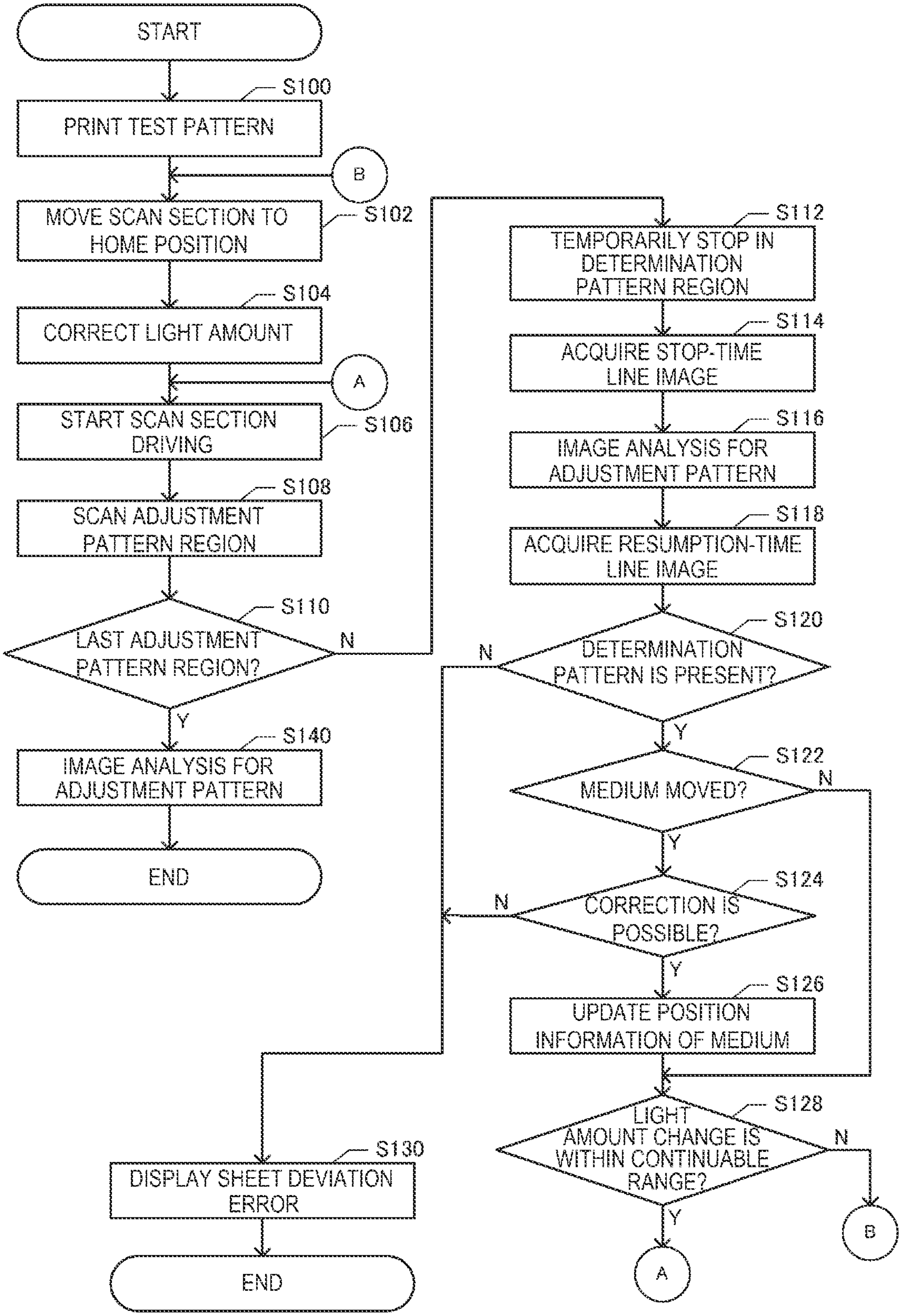
FIG. 10 is a flowchart showing a production method.

FIG. 10 is a flowchart showing a production method for the multifunction peripheral 10. An incomplete multifunction peripheral 10 is a multifunction peripheral that includes assembled mechanical components and electronic components and can perform a printing operation but cannot clearly perform printing because the multifunction peripheral is not adjusted yet. A completed multifunction peripheral 10 is a multifunction peripheral that can clearly perform printing because the multifunction peripheral is adjusted and an adjustment pattern is stored in a nonvolatile memory. The flowchart of FIG. 10 is performed as a part of a production process in a factory or is performed after installation of the incomplete multifunction peripheral 10 in a client.

First, the printing unit 11 of the incomplete multifunction peripheral 10 prints the test pattern 300 on the medium under the control of the printing control section 131 according to user operation (step S100). That is, the printing unit 11 prints the adjustment pattern 310, the multiple circle pattern 220, and the determination pattern 330 on the medium. Consequently, a print on which an adjustment pattern, a position correction pattern (a multiple circle pattern), and a determination pattern serving as identification patterns are printed in predetermined relative positions is produced. Subsequently, the medium is set (placed) on the glass surface 121 by the user and user operation for a scan start is performed. According to the user operation, the scan control section 132 moves the scan section 12 to a home position in order to perform an intermittent scan targeting the medium on which the test pattern 300 is printed (step S102). Subsequently, the scan control section 132 performs light amount correction for the light source, that is, shading correction (step S104). Specifically, the scan control section 132 samples a white reference plate set in the home position to generate white reference data for color correction, extinguishes the light source, and samples a black reference to generate black reference data for color correction.

Subsequently, when the medium on which the test pattern 300 is printed is set on the medium table 122 by the user and a scan instruction is input, the scan control section 132 starts driving of the scan section 12 (step S106). Consequently, the intermittent scan for one scan target medium is started. Subsequently, the scan control section 132 performs a scan of an adjustment pattern region (step S108). The adjustment pattern region is a region including the adjustment pattern and the position correction pattern on the medium. A range in the sub-scanning direction of the scan section 12 corresponding to the adjustment pattern is predetermined. The scan section 12 performs a scan in the predetermined range.

Subsequently, the scan control section 132 determines whether the region scanned in step S108 is a last adjustment pattern region (step S110). The last adjustment pattern region is an adjustment pattern region scanned last among adjustment pattern regions included in one medium. In this embodiment, it is assumed that a range in the sub-scanning direction of the last adjustment pattern region is set in advance in the multifunction peripheral 10. The scan control section 132 determines, according to whether the position of the scan section 12 is within this range, whether the the region scanned in step S108 is the last adjustment pattern region. When the region scanned in step S108 is not the last adjustment pattern region (N in step S110), the scan control section 132 advances the scan section 12 to a determination pattern region. The scan control section 132 temporarily stops the movement of the scan section 12 on the determination pattern region and stops the irradiation by the light source (step S112). The determination pattern region is a region including a determination pattern. A position in the sub-scanning direction of the scan section 12 corresponding to the determination pattern is predetermined. The scan section 12 moves to the predetermined position.

Subsequently, the scan control section 132 acquires a stop-time line image (step S114). Subsequently, the detecting section 133 and the adjusting section 134 perform an image analysis for a scan image of the adjustment pattern obtained in the processing in step S108 (step S116). Specifically, first, the detecting section 133 detects four position correction patterns around the adjustment pattern. The scan control section 132 specifies an adjustment pattern region based on the positions of the position correction patterns. As explained in the first embodiment, a relative positional relation between the adjustment pattern region and the position correction patterns are set in advance. The scan control section 132 specifies the adjustment pattern region based on the positional relation. Further, as explained above, the detecting section 133 adjusts, based on a detection result of four multiple circle patterns, distortion and a tilt of the adjustment pattern in a detection result of the scan image. The adjusting section 134 generates adjustment parameters for the printing unit 11 based on a result of pattern matching of the adjustment pattern and stores the adjustment parameters in the nonvolatile memory 14. Thereafter, the detecting section 133 deletes the scan image recorded in the memory.

When the image analysis is completed and the scan image in the memory is deleted, the scan control section 132 performs a scan again to acquire a resumption-time line image (step S118). Subsequently, the stop-state analyzing section 135 refers to the stop-time line image and the resumption-time line image and checks whether the determination pattern is included in all of the line images. Specifically, when repetition of a white region and a black region is included, the stop-state analyzing section 135 determines that the determination pattern is included (step S120). When the determination pattern is not included (N in step S120), the stop-state analyzing section 135 suspends the temporarily stopped intermittent scan and displays information indicating a sheet deviation error on the display section (step S130). Then, the processing ends. In this case, for example, when the user performs operation for resumption in a state in which the medium is reset, the processor 13 performs the processing from step S102 again according to the user operation.

On the other hand, when the determination pattern is included in step S120 (Y in step S120), the stop-state analyzing section 135 advances the processing to step S122. In step S122, the stop-state analyzing section 135 compares the stop-time line image and the resumption-time line image. Specifically, the stop-state analyzing section 135 determines, based on a total of change amounts of edge positions of the stop-time line image and the resumption-time line image and a reference range, whether the medium has moved.

When the medium has not moved (N in step S122), the stop-state analyzing section 135 advances the processing to step S128. When the medium has moved (Y in step S122), the stop-state analyzing section 135 determines whether a moving distance of the medium can be corrected (step S124). Specifically, the stop-state analyzing section 135 specifies a movement amount and a tilt change amount and compares the movement amount and a movement amount threshold and compares the tilt change amount and a tilt change amount threshold to determine whether the moving distance of the medium can be corrected. It is assumed that the movement amount threshold and the tilt change amount threshold are values decided according to ranges of deviations of a position and a tilt in a state in which the entire medium is included in a readable range of the glass surface 121 and are set in advance.

When the correction is possible (Y in step S124), the stop-state analyzing section 135 calculates a movement amount and a tilt change amount of the medium and updates position information of the medium based on these values (step S126). A position of an image to be scanned later is changed based on the updated position information of the medium. The position information of the medium is information indicating a relative position of the medium with respect to the scan section 12 and is used when the adjustment pattern is analyze. For example, it is assumed that, at a scan start time, the medium is placed in the main scanning direction based on a predetermined angle of the glass surface 121. In this case, in the position information of the medium, a predetermined position of the scan section 12 is indicated as a medium reference position and a main scanning direction and a sub-scanning direction are respectively indicated as a width direction and a length direction of the medium. When the medium has moved, the medium reference position and the directions (the width direction and the length direction) of the medium are updated according to a positional deviation amount and a tilt change amount.

Subsequently, the stop-state analyzing section 135 determines, based on the stop-time line image and the resumption-time line image, whether a light amount change of the scan section 12 is within a continuable range. When the light amount change is within the continuable range (Y in step S128), the scan control section 132 advances the processing to step S106. In this case, the scan control section 132 resumes the intermittent scan by the scan section 12 in a stop position.

When the light amount change is outside the continuable range (N in step S128), the scan control section 132 advances the processing to step S102. That is, the scan control section 132 moves the scan section 12 to the home position, performs the light amount correction again, and, then, performs the intermittent scan on the following adjustment pattern region.

In this way, when the medium has not moved and the light amount change is within the continuable range, the scan control section 132 resumes the intermittent scan from a position where the movement of the scan section 12 has temporarily stopped. Even if the medium has moved, when correction is possible, the scan control section 132 performs correction and, then, resumes the intermittent scan from the position where the movement of the scan section 12 has stopped. On the other hand, when the medium has moved and correction cannot be performed, the scan control section 132 suspends the temporarily stopping intermittent scan.

When the region scanned in step S108 is the last adjustment pattern region in the processing target medium in step S110 (Y in step S110), the detecting section 133 and the adjusting section 134 perform an image analysis for the scanned adjustment pattern (step S140). That is, the detecting section 133 performs pattern matching for the adjustment pattern. The adjusting section 134 generates adjustment parameters for the printing unit 11 based on a matching result and stores the adjustment parameters in the nonvolatile memory. As described above, the adjustment of the multifunction peripheral 10 is performed and production of the completed multifunction peripheral 10 is completed.

As explained above, in the multifunction peripheral 10 in this embodiment, the intermittent scan is continued when the medium has not moved during the temporary stop in the intermittent scan. On the other hand, the intermittent scan is suspended when the medium has moved. Consequently, even when the medium has moved, a size, a position, a tilt, and the like of a test pattern are correctly specified. Further, when the medium has moved, the pattern matching for the scan image is not performed assuming that the medium has not moved. The pattern matching can be correctly performed. The movement of the medium can be detected even when an edge of the medium cannot be detected. By using the multiple circle pattern, it is possible to produce the multifunction peripheral 10 in which the printing section is highly accurately adjusted. In an image analysis relating to the scan image of the adjustment pattern printed on the medium, a size, a position, a tilt, and the like of the adjustment pattern can be correctly specified.

Figure 11A:
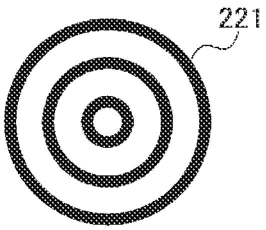
FIG. 11A is a diagram showing a first modification.
Figure 11B:
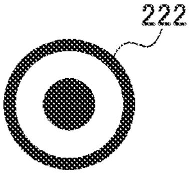
FIG. 11B is a diagram showing the first modification.
Figure 12A:
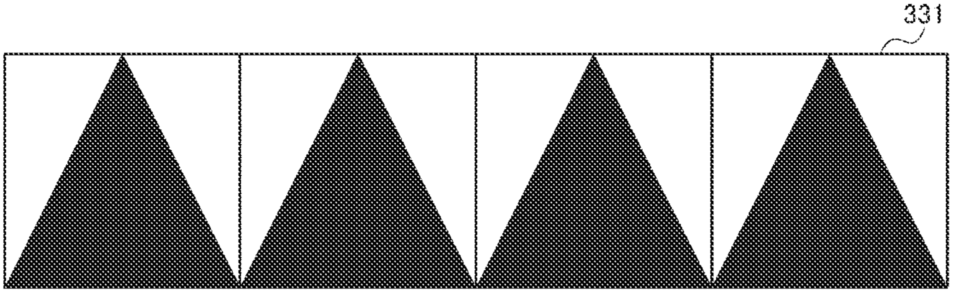
FIG. 12A is a diagram showing a ninth modification.
Figure 12B:
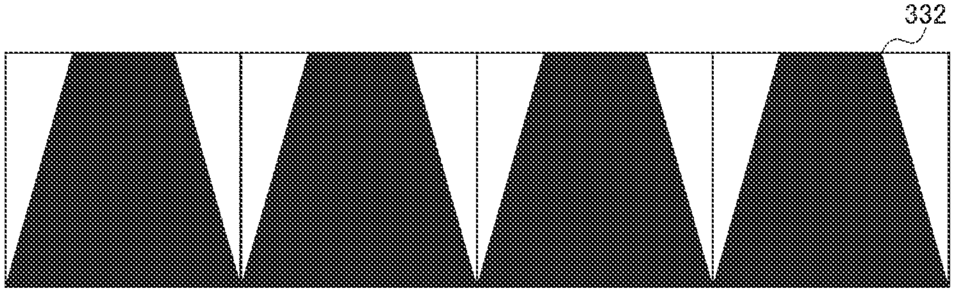
FIG. 12B is a diagram showing the ninth modification.
Figure 12C:
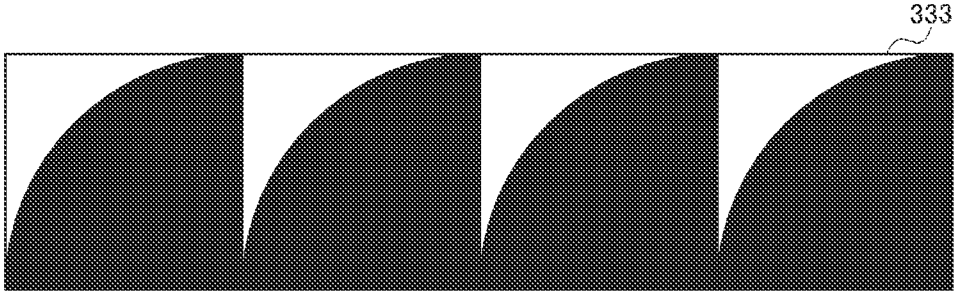
FIG. 12C is a diagram showing the ninth modification.
Figure 12D:
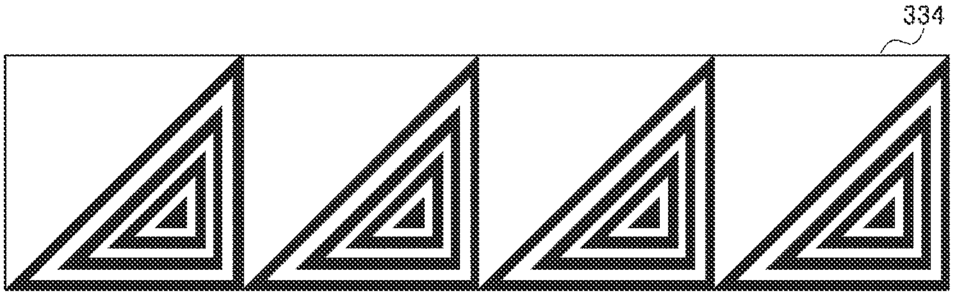
FIG. 12D is a diagram showing the ninth modification.

FIGS. 11A and 11B are diagrams showing a first modification of this embodiment. As the first modification, the multiple circle pattern is not limited to the double circle and only has to be a pattern formed by a plurality of circles. For example, as shown in FIG. 11A, the multiple circle pattern may be a pattern showing three circumferences having the same center and having different radiuses, that is, a triple circle pattern 221. As another example, as shown in FIG. 11B, the multiple circle pattern may be a pattern 222 including a painted-out concentric circle. In this way, even when the multiple circle pattern includes the painted-out circle, an edge is increased by adding a line indicating a circumference to the outer side of the painted-out circle. Therefore, even when nozzle skipping occurs, a center position of the multiple circle pattern can be highly accurately specified. In this way, the multiple circle pattern only has to be a pattern showing a plurality of circumferences having different radiuses. A specific number of circumferences and the like are not limited to the embodiment. Further, the painted-out circle may be included in or may not be included in the center of multiple circles.

As a second modification, the number, a size, width of lines, and an interval of the lines of circumferences in the multiple circle pattern are not limited to the embodiment. For example, in a case in which there is no problem even if the size of the multiple circle pattern is large, the width and the interval of the lines may be wider.

As a third modification, the multiple circle pattern only has to be formed by ink of one color and is not limited to black. The multifunction peripheral 10 may include a plurality of print heads 111 for each of the nozzle rows for the colors. In this case, it is assumed that the multiple circle pattern is printed by a nozzle row corresponding to the ink of the one color included in one print head 111.

As a fourth modification, the printing unit 11 only has to be a printing unit that realizes printing with ink. A scheme of the printing unit 11 is not limited to the inkjet scheme. As another example, the printing unit 11 may perform printing in a sublimation transfer scheme. As another example, the printing unit 11 may perform printing in a laser scheme.

As a fifth modification, the multifunction peripheral 10 may produce a print on which a multiple circle pattern is printed together with an identification pattern that is a target of pattern recognition. Examples of such a print include a marksheet. A multiple circle pattern, a relative positional relation of which with a pattern showing a mark position serving as an identification pattern is known, may be printed on a medium used as the marksheet. The number of multiple circle patterns printed on the print is not limited. For example, when it is desired to specify a position of certain one point on the print, a multiple circle pattern only has to be printed at the one point. When it is desired to specify a predetermined direction on a medium, multiple circle patterns at two points only have to be printed on a straight line, an angle of which formed with the direction desired to be specified is known. When it is desired to specify a predetermined rectangular range on a medium, multiple circle patterns at least at three points only have to be printed. It is assumed that the three points are arranged at three vertexes in the rectangular range.

As a sixth modification, the multifunction peripheral 10 may include the print head 111 capable of using both of pigment ink and dye ink as ink. In this case, it is assumed that the print head 111 prints a multiple circle pattern using only the pigment ink. It is known that the dye ink bleeds more than the pigment ink. It is also known from FIGS. 6A and 6B that the multiple circle pattern can be more accurately detected when the multiple circle pattern is printed using the pigment ink. Therefore, when both of the pigment ink and the dye ink can be used in this way, it is desirable to use the pigment ink.

A seventh modification is explained. In the embodiment, a method of producing the multifunction peripheral 10 by setting the adjustment pattern for the print head 111 of the incomplete multifunction peripheral 10 is explained. However, the printing of the test pattern, the generation of the scan image of the test pattern, and the setting of the adjustment pattern by the analysis of the scan image executed in the multifunction peripheral 10 may be executed at timing other than the production time. The setting of the adjustment pattern may be executed, for example, at a maintenance time of the multifunction peripheral 10.

An eighth modification is explained. Production target equipment only has to be an apparatus including a printing section and is not limited to the multifunction peripheral. The production target equipment may be a printing apparatus. Further, when the production target equipment is the printing apparatus, the printing of the test pattern and the setting of the generated adjustment pattern only have to be performed in the printing apparatus. The other processing is executed by a scan apparatus (a scanner) different from the printing apparatus. That is, the scan apparatus generates a scan image from a medium on which the test pattern is printed, generates the adjustment pattern, and transmits the adjustment pattern to the printing apparatus. In this case, it is assumed that information concerning the printing apparatus necessary for generating the adjustment pattern is stored in advance in the scan apparatus. As another example, the scan apparatus may perform only the generation of the scan image and the processing for generating the adjustment pattern from the scan image may be performed by the production target printing apparatus.

As another example, the scan apparatus may perform only the generation of the scan image and an adjusting apparatus, which is equipment different from the scan apparatus and the printing apparatus, may perform the processing for generating the adjustment pattern from the scan image. In this case, the scan image is transmitted from the scan apparatus to the adjusting apparatus and adjustment parameters are transmitted from the adjusting apparatus to the printing apparatus.

FIGS. 12A to 12D are diagrams showing a ninth modification. The determination pattern only has to be a determination pattern including a plurality of lines inclining with respect to the main scanning direction and having different inclination angles with respect to the main scanning direction. A determination pattern 341 shown in FIG. 12A includes a black triangle, a vertex of which is located in a position other than vertexes of a square. A determination pattern 342 shown in FIG. 12B includes a trapezoid. A determination pattern 343 shown in FIG. 12C includes a quadrant. In this way, a line (a boundary line) is not limited to a straight line and may be a curved line. A determination pattern 344 shown in FIG. 12D includes a plurality of triangular lines having the same center of gravity. When the number of lines increases in this way, it is possible to more accurately specify presence or absence of a movement of a medium and a degree of the movement.

The determination pattern only has to be a pattern in which the length of a detection range of the determination pattern changes when the tilt of the medium has changed and a pattern to be scanned changes when the medium has moved. Therefore, the determination pattern does not need to be the repetition of the reference pattern. It is assumed that the determination pattern includes a black range and a white range. However, the determination pattern only has to include a range in which ink is ejected and a range (a white range) in which the ink is not ejected. A color of the ink is not limited to black.

As a tenth modification, the scan control section 132 may temporarily stop the intermittent scan, when it is determined that the medium has moved, resume the intermittent scan, and, when a position correction pattern is detected in the following adjustment pattern region, continue the intermittent scan. In this case, the scan control section 132 only has to update, based on the position of the detected correction position pattern, position information indicating a relative position of the medium with respect to a reading position of the scan section 12. When a position correction pattern is not detected in the following adjustment pattern region, the scan control section 132 may suspend the intermittent scan at that point in time.

As an eleventh modification, when a plurality of media are continuously scanned, the scan section 12 temporarily stops in a position corresponding to the determination pattern after the scan for one medium is completed. The stop-state analyzing section 135 may determine, based on a stop-time line image and a resumption-time line image, whether the medium has been changed to a new medium. Specifically, the stop-state analyzing section 135 acquires a stop-time line image at the temporary-stop time. Thereafter, after changing the medium to the new medium, the user performs operation for rescan. The scan control section 132 causes the scan section 12 to perform a scan in the stop position according to the user operation. The stop-state analyzing section 135 acquires a line image (a resumption-time line image). When a change amount of an edge position is equal to or larger than an allowable range in the stop-time line image and the resumption-time line image, the stop-state analyzing section 135 determines that the medium has been changed to the new medium. When the change amount of the edge position is smaller than the allowable range, the stop-state analyzing section 135 determines that the user has performed operation for rescan without replacing the medium and urges the user to replace the medium.

The allowable range is a preset range. It is assumed that the allowable range is a range wider than a reference range for determining whether the medium has moved. That is, the allowable range includes a larger change amount of the edge position compared with the reference range.

As a twelfth modification, the scan section 12 may not be a line sensor. That is, the scan section 12 may scan one line in the width direction of the medium while moving in the main scanning direction.

A thirteenth modification is explained. In the embodiment, a method of producing the multifunction peripheral 10 by setting the adjustment parameters for the print head 111 of the incomplete multifunction peripheral 10 is explained. However, the printing of the test pattern, the generation of the scan image of the test pattern, and the setting of the adjustment parameters by the analysis of the scan image executed in the multifunction peripheral 10 may be executed at timing other than the production time. The setting of the adjustment parameters may be executed, for example, at a maintenance time of the multifunction peripheral 10.

The embodiment explained above is an example for carrying out the present disclosure. Other various embodiments can be adopted. Various modifications and changes are possible within the scope of the gist of the present disclosure described in the claims, for example, a modification of a certain embodiment is applied to another embodiment.

A multiple circle pattern may be searched targeting the entire scan image. In particular, a multiple circle pattern is searched targeting a comparison region set based on the upper left vertex 211 in a first search and, when a multiple circle pattern is not found, a multiple circle pattern may be searched targeting the entire scan image.

The entire medium may be scanned at a time without performing the intermittent scan. In particular, the intermittent scan may be performed if a free capacity of the memory is small in other processing. However, the intermittent scan may not be performed when other processing is not performed and the free capacity is large.

The movement of the medium in the intermittent scan may be determined using the determination pattern when a medium on which an adjustment pattern is not printed is scanned.

After the adjustment parameters are stored in the nonvolatile memory, another process not affecting printing quality may be performed to complete the multifunction peripheral 10.

Further, the present disclosure is also applicable as a program and a method executed by a computer. The present disclosure is realized as an independent apparatus explained above in some cases and is realized using components included in a plurality of apparatuses in other cases and includes various aspects. The present disclosure can be changed as appropriate, for example, a part of the present disclosure is software and another part is hardware. Further, the present disclosure is realized as a recording medium for a program for controlling a system. Naturally, the recording medium for the program may be a magnetic recording medium or may be a semiconductor memory. Any recording medium to be developed in the future can be considered completely the same.

What is claimed is:

1. A printing apparatus producing method for producing a printing apparatus adjusted from a printing apparatus before adjustment, the printing apparatus producing method comprising:

causing a printing section of the printing apparatus before adjustment to print a multiple circle pattern and an adjustment pattern in predetermined relative positions on a medium, the multiple circle pattern being a pattern indicating a plurality of circumferences of concentric circles having different radii;

setting the printed medium with respect to a scan section;

scanning the printed medium and generating a scan image;

detecting the multiple circle pattern from the scan image;

detecting the adjustment pattern based on the relative positions and a detection position of the multiple circle pattern;

calculating adjustment parameters based on a detection result of the adjustment pattern; and storing the adjustment parameters in a nonvolatile memory of the printing apparatus before adjustment.

2. The printing apparatus producing method according to claim 1, wherein an interval of adjacent circles of the concentric circles included in the multiple circle pattern is equal to or more than seven pixels.

3. The printing apparatus producing method according to claim 2, wherein the interval of the adjacent circles of the concentric circles included in the multiple circle pattern is equal to or more than eight pixels.

4. The printing apparatus producing method according to claim 2, wherein thickness of lines of the concentric circles included in the multiple circle pattern is equal to or more than seven pixels.

5. The printing apparatus producing method according to claim 4, wherein the thickness of the lines of the concentric circles included in the multiple circle pattern is equal to or more than eight pixels.

6. The printing apparatus producing method according to claim 1, wherein the multiple circle pattern includes a painted-out circle in a center.

7. The printing apparatus producing method according to claim 1, wherein the multiple circle pattern is a pattern showing a double concentric circle or a triple concentric circle.

8. The printing apparatus producing method according to claim 7, wherein the multiple circle pattern is a pattern showing the double concentric circle.

9. The printing apparatus producing method according to claim 1, wherein the printing section performs the printing in an inkjet scheme.

10. The printing apparatus producing method according to claim 9, wherein, when printing using both of pigment ink and dye ink is possible, the printing section prints the multiple circle pattern using only the pigment ink.

11. The printing apparatus producing method according to claim 1, wherein the multiple circle pattern is detected with pattern matching of the scan image and an image of the multiple circle pattern.

12. The printing apparatus producing method according to claim 1, wherein the printing section includes a print head including a nozzle row in which nozzles are arrayed in a sub-scanning direction, and the multiple circle pattern is printed in one path by the nozzle row for a same color included in one of the print head.

13. The printing apparatus producing method according to claim 1, wherein before the adjustment, the printing section is caused to print the multiple circle pattern and the adjustment pattern on the medium such that the multiple circle pattern is separate and apart from the adjustment pattern, in the predetermined relative positions.

14. An adjusting apparatus that adjusts a printing section of a printing apparatus, the adjusting apparatus comprising:

a detecting section configured to detect a multiple circle pattern in a scan image generated by scanning a medium on which the multiple circle pattern and an adjustment pattern used for the adjustment of the printing section are printed in predetermined relative positions by the printing section and detect the adjustment pattern based on the relative positions and a detection position of the multiple circle pattern, the multiple circle pattern being a pattern indicating a plurality of circumferences of concentric circles having different radii; and an adjusting section configured to store, in a nonvolatile memory, adjustment parameters for the printing section based on a detection result of the adjustment pattern.

15. A non-transitory computer-readable storage medium storing an adjusting program for adjusting a printing section of a printing apparatus, the adjusting program causing a computer to function as:

a pattern detecting section configured to detect a multiple circle pattern in a scan image generated by scanning a medium on which the multiple circle pattern and an adjustment pattern used for the adjustment of the printing section are printed in predetermined relative positions by the printing section and detect the adjustment pattern based on a detection position of the multiple circle pattern and the relative positions, the multiple circle pattern being a pattern indicating a plurality of circumferences of concentric circles having different radii; and an adjusting section configured to store, in a nonvolatile memory, adjustment parameters for the printing section based on a detection result of the adjustment pattern.

* * * * *